(12) United States Patent
Takushima (10) Patent No.: US 9,083,141 B2
(45) Date of Patent: Jul. 14, 2015

(54) OPTICAL COMPONENT, OPTICAL FIBER AMPLIFIER, AND OPTICAL FIBER RING RESONATOR

(71) Applicant: SUMITOMO ELECTRIC INDUSTRIES, LTD., Osaka-shi, Osaka (JP)

(72) Inventor: Michiko Takushima, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 13/940,893

(22) Filed: Jul. 12, 2013

(65) Prior Publication Data

US 2014/0022627 A1   Jan. 23, 2014

Related U.S. Application Data

(60) Provisional application No. 61/672,339, filed on Jul. 17, 2012.

(30) Foreign Application Priority Data

Jul. 17, 2012   (JP) .................. 2012-158364

(51) Int. Cl.
| | |
|---|---|
| G02B 6/02 | (2006.01) |
| H01S 3/067 | (2006.01) |
| G02B 6/26 | (2006.01) |
| G02B 6/38 | (2006.01) |
| G02B 6/293 | (2006.01) |
| H01S 3/16 | (2006.01) |

(52) U.S. Cl.
CPC ........ *H01S 3/06783* (2013.01); *G02B 6/02042* (2013.01); *G02B 6/262* (2013.01); *G02B 6/2934* (2013.01); *G02B 6/3831* (2013.01); *H01S 3/06737* (2013.01); *H01S 3/06791* (2013.01); *H01S 3/1608* (2013.01)

(58) Field of Classification Search
CPC .. G02B 6/262; G02B 6/02042; G02B 6/2934; G02B 6/264; H01S 3/06708; H01S 3/06754; H01S 3/06783; H01S 3/06737; H01S 3/06791; H01S 3/1608
USPC ............................................... 359/341.1, 349
See application file for complete search history.

(56) References Cited

U.S. PATENT DOCUMENTS

| 5,566,196 A * | 10/1996 | Scifres ............................. 372/6 |
| 2004/0196537 A1 * | 10/2004 | Starodoumov ............. 359/341.3 |
| 2006/0045163 A1 * | 3/2006 | Chuang et al. ................ 372/100 |

(Continued)

FOREIGN PATENT DOCUMENTS

| JP | 6-129916 A | 5/1994 |
| JP | 4032648 B2 | 1/2008 |

*Primary Examiner* — Eric Bolda
(74) *Attorney, Agent, or Firm* — Drinker Biddle & Reath LLP (57) ABSTRACT

An optical component includes a multicore optical fiber and an I/O optical fiber. The multicore optical fiber has longitudinally extending cores within a common cladding. The cores are arranged on a circumference of a circle centered at a fiber axis in an end face of the multicore optical fiber. Both end faces of the multicore optical fiber are connected to each other such that the cores of the multicore optical fiber are optically connected to each other. Both end faces of the multicore optical fiber are adapted to rotate relative to each other about the fiber axis.

10 Claims, 10 Drawing Sheets

(56) References Cited

U.S. PATENT DOCUMENTS

2009/0314333 A1* 12/2009 Shepard ..................... 136/248
2011/0037972 A1* 2/2011 Bergh ....................... 356/73.1
2011/0279888 A1* 11/2011 Fini et al. .................... 359/334
2013/0163072 A1* 6/2013 Chang et al. ................ 359/341.3
2014/0036351 A1* 2/2014 Fini et al. ................... 359/341.31
2014/0119694 A1* 5/2014 Abedin et al. ................ 385/43

* cited by examiner

OPTICAL COMPONENT, OPTICAL FIBER AMPLIFIER, AND OPTICAL FIBER RING RESONATOR

CROSS-REFERENCE RELATED APPLICATIONS

This application claims priority to Provisional Application Ser. No. 61/672,339 filed on Jul. 17, 2012 and claims the benefit of Japanese Patent Application No. 2012-158364, filed on Jul. 17, 2012, all of which are incorporated herein by reference in their entirety.

BACKGROUND

1. Field

The present invention relates to an optical component, an optical fiber amplifier, and an optical fiber ring resonator.

2. Background

Some of devices including optical components using optical fibers necessitate a relatively long optical fiber or vary their characteristics depending on the length of an optical fiber as in an optical fiber amplifier (see Japanese Patent Publication No. 4032648) or an optical fiber ring resonator (see Japanese Patent Application Laid-Open No. H06-129916), for example.

SUMMARY

Devices such as those mentioned above tend to have larger optical components and make it necessary to replace their optical components when their characteristics must be changed as their environment of use varies. For overcoming the problems mentioned above, it is an object of the present invention to provide an optical component which is not required to be replaced when changing characteristics and can be made smaller. It is another object of the present invention to provide an optical fiber amplifier and an optical fiber ring resonator which are equipped with such an optical component.

The optical component in accordance with the present invention, as one aspect, comprises a multicore optical fiber having a plurality of longitudinally extending cores within a common cladding, an I/O optical fiber configured to feed light to/from a specific core in the plurality of cores of the multicore optical fiber, and a fiber coupler configured to optically couple the specific core of the multicore optical fiber and a core of the I/O optical fiber to each other. Further, in the optical component, the plurality of cores are arranged on a circumference of a circle centered at a fiber axis in an end face of the multicore optical fiber, while first and second end faces of the multicore optical fiber are connected to each other such that first and second cores in the plurality of cores of the multicore optical fiber are optically connected to each other.

The present invention will be more fully understood from the detailed description given herein below and the accompanying drawings, which are given by way of illustration only and are not to be considered as limiting the present invention.

Further, scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DETAILED DESCRIPTION

[Explanation of the Embodiment]

Firstly, the contents of the embodiment of the present invention will be listed and explained below.

The optical component in accordance with the present invention, as one aspect, comprises a multicore optical fiber having a plurality of longitudinally extending cores within a common cladding, an I/O optical fiber configured to feed light to/from a specific core in the plurality of cores of the multicore optical fiber, and a fiber coupler configured to optically couple the specific core of the multicore optical fiber and a core of the I/O optical fiber to each other. Further, in the optical component, the plurality of cores are arranged on a circumference of a circle centered at a fiber axis in an end face of the multicore optical fiber, while first and second end faces of the multicore optical fiber are connected to each other such that first and second cores in the plurality of cores of the multicore optical fiber are optically connected to each other.

In the optical component, at least three cores may be arranged at a fixed pitch on the circumference of the circle centered at the fiber axis in the end face of the multicore optical fiber. The optical component may further comprise rotation unit configured to rotate the first and second end faces of the multicore optical fiber relative to each other about the fiber axis. In the optical component, a distance between the cores in the fiber coupler may be shorter than the sum of the shortest distance from an outer periphery of the specific core of the multicore optical fiber to an outer periphery of the cladding thereof and the shortest distance from an outer periphery of the core of the I/O optical fiber to an outer periphery of a cladding thereof.

In the optical component, each of the plurality of cores of the multicore optical fiber is doped with a rare-earth ion. The rare-earth ion may be an Er ion. In the optical component, the fiber coupler comprises a first coupler and a second coupler.

The optical fiber amplifier in accordance with the present invention, as other aspect, comprises the optical component having each of the plurality of cores of the multicore optical fiber doped with a rare-earth ion and an excitation light source configured to output excitation light that excites the rare-earth ion added to each of the plurality of cores of the multicore optical fiber of the optical component. In the optical fiber amplifier, the fiber coupler of the optical component introduces the excitation light and signal light to the core of the multicore optical fiber and takes out the signal light amplified in the core of the multicore optical fiber.

In the optical fiber amplifier, the fiber coupler of the optical component may have a coupling efficiency of 90% or higher at each of wavelengths of the signal light and the excitation light. In the optical fiber amplifier, the fiber coupler may comprise a first coupler and a second coupler, wherein the first coupler has a coupling efficiency of 90% or higher at each of wavelengths of the signal light and excitation light, while the second coupler has a coupling efficiency of 90% or higher at the wavelength of the signal light and 10% or lower at the wavelength of the excitation light.

The optical fiber ring resonator in accordance with the present invention, as other aspect, includes the optical component, wherein the fiber coupler has a coupling efficiency of 10% or lower.

[Details of the Embodiment]

In the following, embodiments for carrying out the present invention will be explained in detail with reference to the accompanying drawings. In the explanation of the drawings, the same constituents will be referred to with the same signs while omitting their overlapping descriptions.

Figure 1:
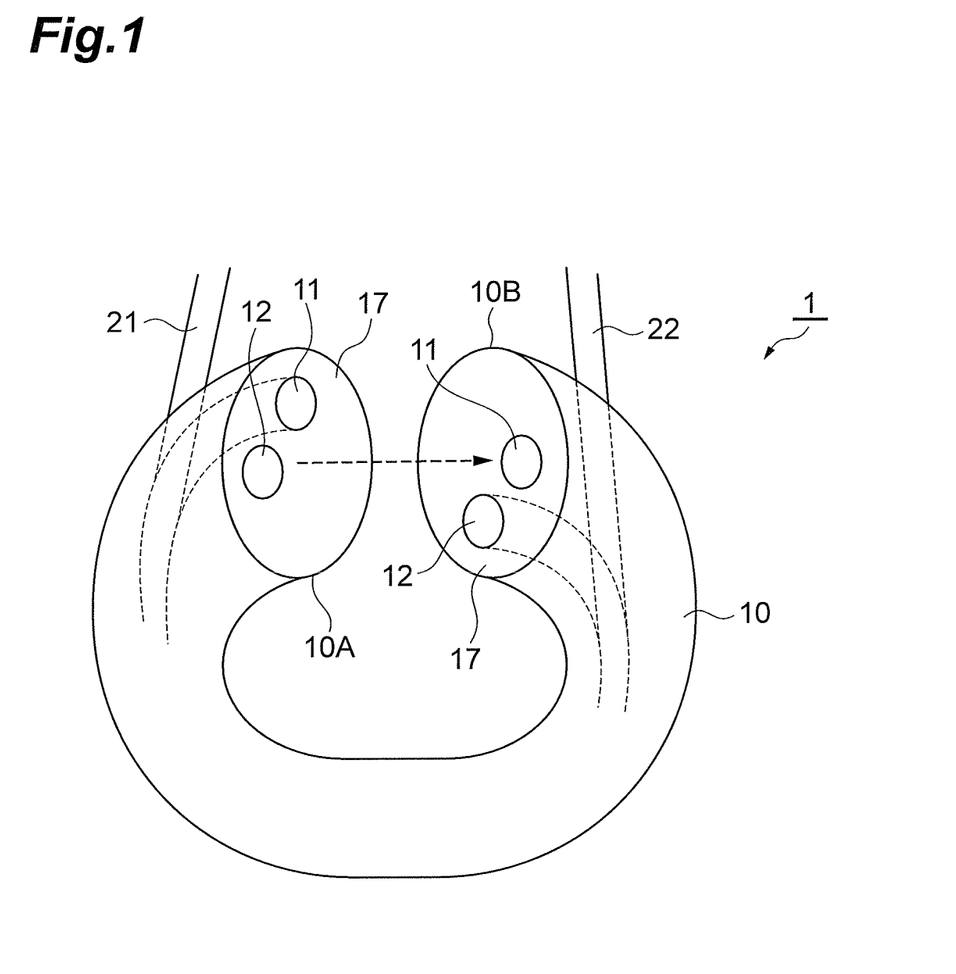
FIG. 1 is a diagram for explaining the structure of an optical component 1 in accordance with a first embodiment.

FIG. 1 is a diagram for explaining the structure of an optical component 1 in accordance with the first embodiment. The optical component 1 has the most basic structure and comprises a multicore optical fiber 10 and I/O optical fibers 21, 22. The multicore optical fiber 10 has longitudinally extending cores 11, 12 within a common cladding 17. Each of the I/O optical fibers 21, 22 is a single-core optical fiber. Each of the multicore optical fiber 10 and the I/O optical fibers 21, 22 is made of silica glass and has a higher refractive index in the core than in the cladding.

The I/O optical fiber 21 is used for feeding light to/from the core 11 of the multicore optical fiber 10. The core of the I/O optical fiber 21 and the core 11 of the multicore optical fiber 10 construct a fiber coupler which enables mutual optical coupling therebetween. The I/O optical fiber 22 is used for feeding light to/from the core 12 of the multicore optical fiber 10. The core of the I/O optical fiber 22 and the core 12 of the multicore optical fiber 10 construct a fiber coupler which enables mutual optical coupling therebetween. Here, the illustration of the fiber couplers is simplified in FIG. 1.

The cores 11, 12 are arranged on the periphery of a circle centered at the fiber axis in each of end faces 10A, 10B of the multicore optical fiber 10. The end faces 10A, 10B of the multicore optical fiber 10 are connected to each other such that the cores 11, 12 of the multicore optical fiber 10 are optically connected to each other. The end faces 10A, 10B of the multicore optical fiber 10 are adapted to rotate relative to each other about the fiber axis. For convenience of explanation, the end faces 10A, 10B of the multicore optical fiber 10 are depicted as being separated from each other in FIG. 1.

Light introduced from the I/O optical fiber 22 to the core 12 of the multicore optical fiber 10 is guided through the core 12 and then through the core 11 of the multicore optical fiber 10, so as to exit from the core 11 to the I/O optical fiber 21. If the core of the I/O optical fiber 21 and the core 11 of the multicore optical fiber 10 are optically coupled to each other at a position near the end face 10A of the multicore optical fiber 10 while the core of the I/O optical fiber 22 and the core 12 of the multicore optical fiber 10 are optically coupled to each other at a position near the end face 10B of the multicore optical fiber 10, the light can circulate through the multicore optical fiber 10 substantially twice. Hence, this optical component 1 can be made smaller.

Figure 2A:
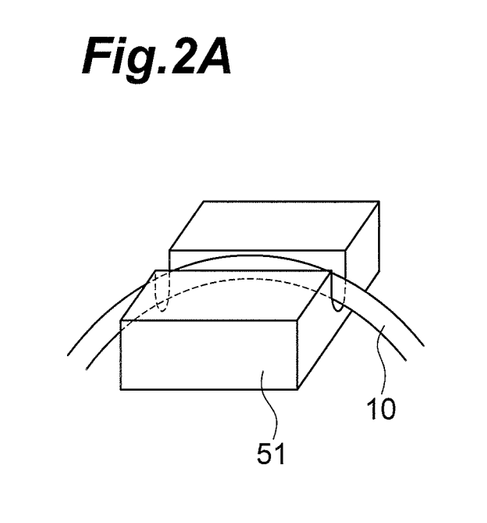
FIGS. 2A to 2C are a set of diagrams for explaining a method of manufacturing a fiber coupler.
Figure 2B:
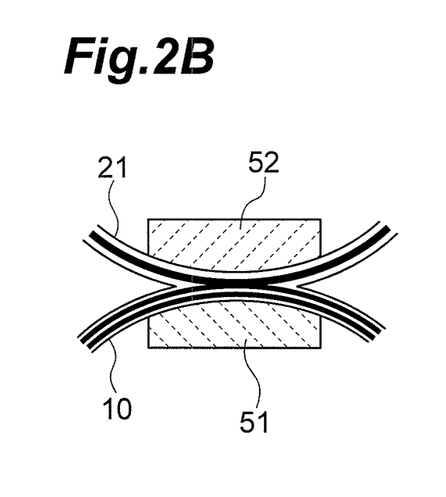
Figure 2C:
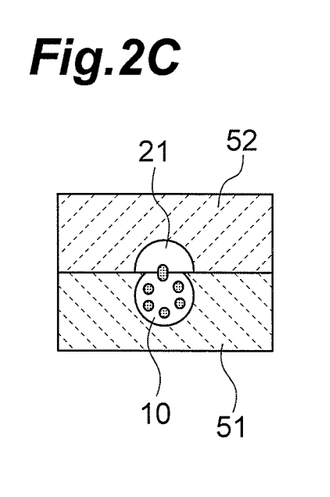

FIGS. 2A to 2C are a set of diagrams for explaining a method of manufacturing a fiber coupler. The fiber coupler in this embodiment can be manufactured by the same method as with a typical polished optical fiber coupler. As illustrated in FIG. 2A, the multicore optical fiber 10 is inserted into and bonded to a substrate 51 provided with a groove having a curvature, and then a side face of the multicore optical fiber 10 is polished together with the substrate 51 until any of the cores is exposed. Similarly, the I/O optical fiber 21 is inserted into and bonded to a substrate 52 provided with a groove having a curvature, and then a side face of the I/O optical fiber 21 is polished together with the substrate 52 until the core is exposed.

Subsequently, as illustrated in FIGS. 2B and 2C, the multicore optical fiber 10 and I/O optical fiber 21 are attached to each other such that no air layer intervenes therebetween. Optical coupling can be generated between the core of the multicore optical fiber 10 and the I/O optical fiber 21. This can produce a fiber coupler. The distance between the cores in the fiber coupler is shorter than the total of the shortest distance from the outer periphery of the core of the multicore optical fiber 10 to the outer periphery of the cladding and the shortest distance from the outer periphery of the core of the I/O optical fiber 21 to the outer periphery of the cladding. The coupling efficiency can be controlled by adjusting the amount of exposure of the core at the time of polishing.

In the case of a fiber coupler based on such a coupling scheme, one end of the multicore optical fiber may be provided with the fiber coupler, so that both ends of the I/O optical fiber 21 can be used as optical I/O ports as in the structure of FIG. 5 which will be explained later. This structure may incur light propagating from one port to the other port without entering the multicore optical fiber or light entering the multicore optical fiber again when exiting from the multicore optical fiber to a port. When such light adversely affects transmission, the coupling efficiency in the fiber coupler is preferably made as high as possible, e.g., 90%.

Figure 3A:
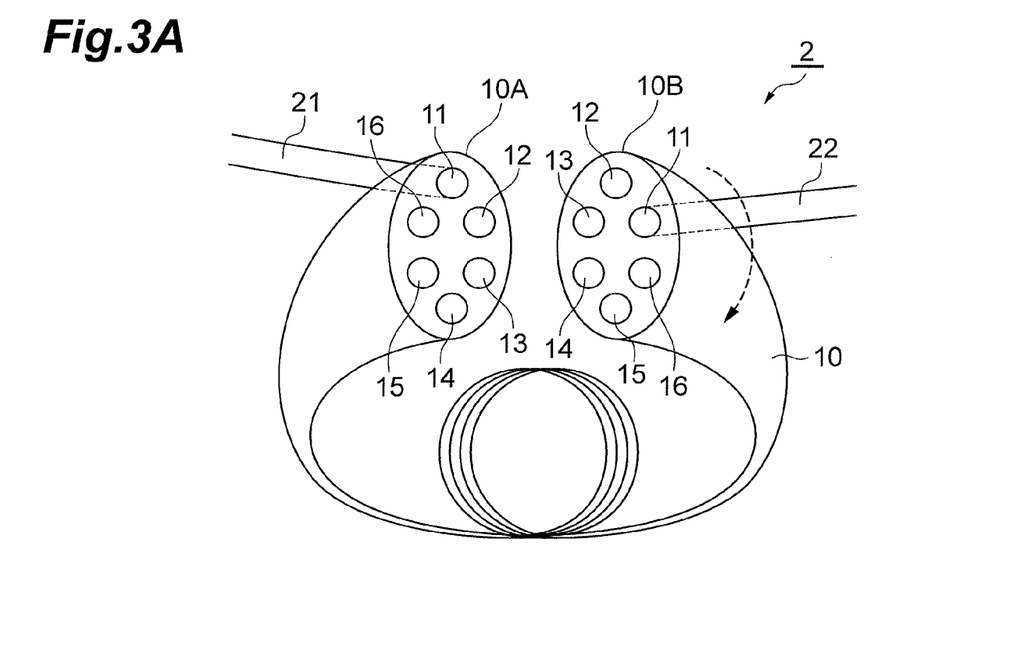
FIGS. 3A and 3B are a set of diagrams for explaining the structure of an optical component 2 in accordance with a second embodiment.
Figure 3B:
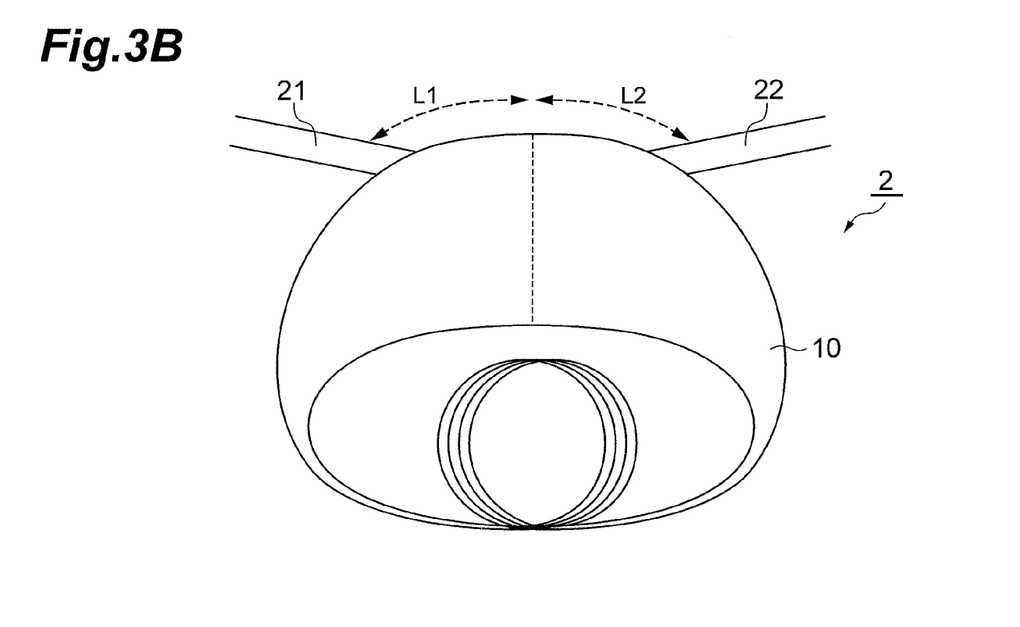

FIGS. 3A and 3B are a set of diagrams for explaining the structure of an optical component 2 in accordance with the second embodiment. The optical component 2 comprises a multicore optical fiber 10 and I/O optical fibers 21, 22. The multicore optical fiber 10 has longitudinally extending cores 11 to 16 within a common cladding. Six cores 11 to 16 are arranged at a fixed pitch on the circumference of a circle centered at the fiber axis in each of the end faces 10A, 10B of the multicore optical fiber 10.

The end faces 10A, 10B of the multicore optical fiber 10 are connected to each other as illustrated in FIG. 3B such that the cores 11, 12, 13, 14, 15, and 16 of the end face 10A are optically connected to the cores 12, 13, 14, 15, 16, and 11 of the end face 10B, respectively, as illustrated in FIG. 3A. For convenience of explanation, the end faces 10A, 10B of the multicore optical fiber 10 are depicted as being separated from each other in FIG. 3A.

Let "L" be the length of the multicore optical fiber 10. At a distance $L_1$ from the end face 10A of the multicore optical fiber 10, the I/O optical fiber 21 is optically coupled to the core 11 of the multicore optical fiber 10 by a fiber coupler. At a distance $L_2$ from the end face 10B of the multicore optical fiber 10, the I/O optical fiber 22 is optically coupled to the core 11 of the multicore optical fiber 10 by a fiber coupler.

Light introduced from the I/O optical fiber 21 to the core 11 of the multicore optical fiber 10 through the fiber coupler is guided through the core 11 by the distance $L_1$ and then fed to the core 12 at the interface, so as to be guided by the distance L through the core 12. Similarly, the light is guided by the distance L through each of the cores 13 to 16. Thereafter, the light introduced from the core 16 to the core 11 at the interface is guided by the distance $L_2$ through the core 11 and then issued to the I/O optical fiber 22 through the fiber coupler. As a result, the distance by which the light propagates through the multicore optical fiber 10 is 5 $L+L_1+L_2$.

The end faces 10A, 10B of the multicore optical fiber 10 are adapted to rotate relative to each other about the fiber axis. Preferably, a rotation unit (e.g., a rotary connector structure) for rotating the end faces 10A, 10B of the multicore optical fiber 10 relative to each other about the fiber axis is provided.

Figure 9A:
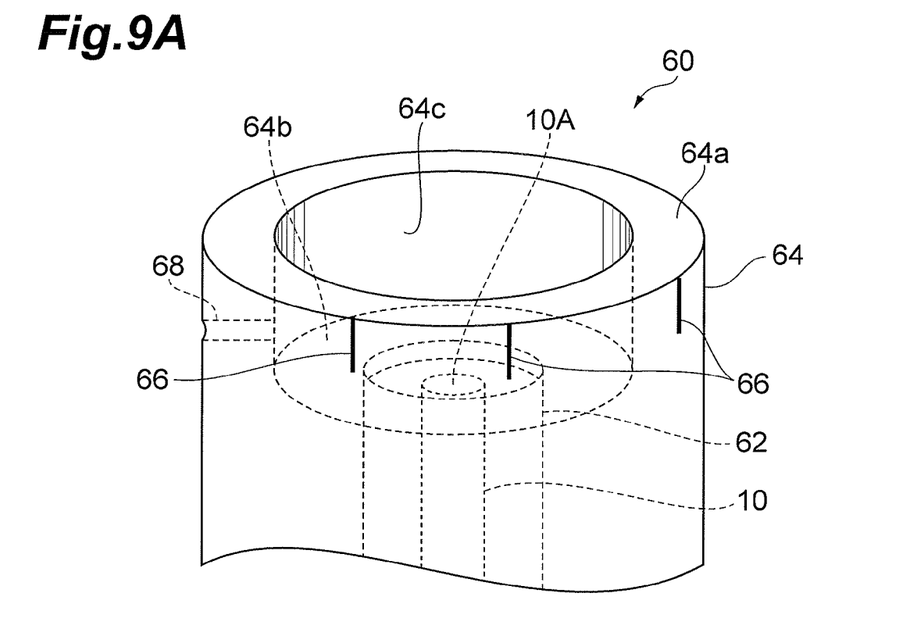
FIGS. 9A and 9B are a set of diagrams for explaining the structure of rotary connectors.

FIGS. 9A and 9B show an example of a rotary connector structure. As shown in FIG. 9A, a connector 60 comprises a ferrule 62 fitted to a one end including the end face 10A of the multicore optical fiber 10, and a holder 64 that holds the ferrule 62. The end face 10A of the multicore optical fiber 10 and the ferrule 62 are disposed so as to be set inward from an end face 64a of the holder 64. A part 64b of an inner circumference side of the holder 64 is also similarly female shaped, forming a recessed portion 64c. The end face 10A and the ferrule 62 are disposed so as to be set further inward from a bottom surface of the part 64b of the holder 64. An outer circumference of the holder 64 is marked with memories 66 at each predetermined rotational angle corresponding to each position of cores 11 to 16. A side face of an end portion of the holder 64 is provided with a screw hole 68 for use in fastening.

Figure 9B:
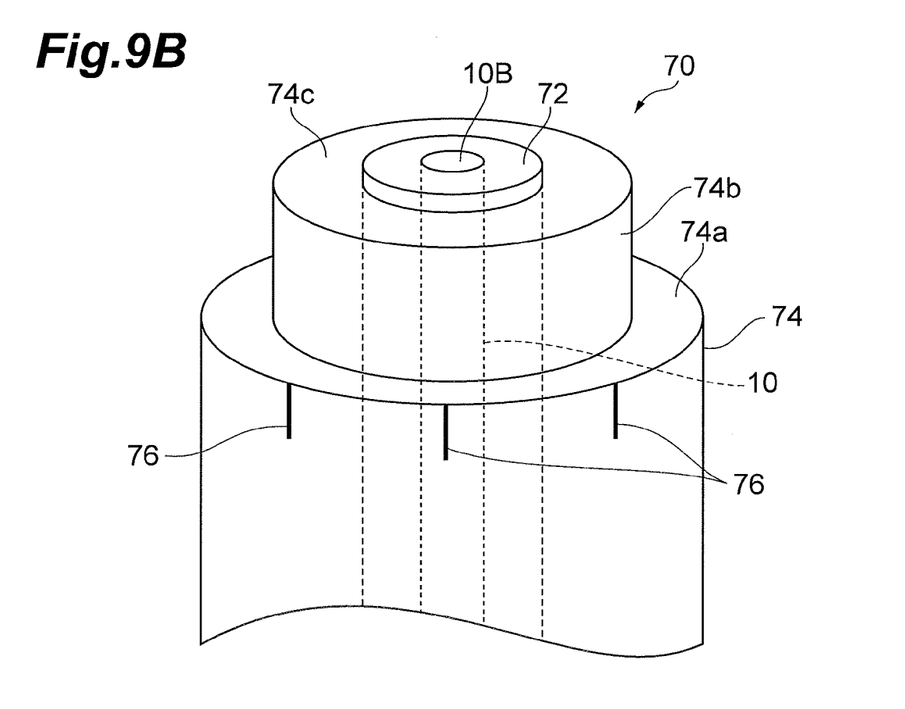

An other connector 70 comprises a ferrule 72 fitted to an other end including the end face 10B of the multicore optical fiber 10, and a holder 74 that holds the ferrule 72, as shown in FIG. 9B. The end face 10B of the multicore optical fiber 10 and the ferrule 72 are disposed in a male form so as to project outward from an end face 74a of the holder 74. A part 74b of an inner circumference side of the holder 74 also similarly projects outward. The end face 10B and the ferrule 72 are disposed so as to further project outward from a projected surface 74c of the part 74b of the holder 74. An outer circumference of the holder 74 is marked with memories 76 at each predetermined rotational angle corresponding to each position of cores 11 to 16.

Figure 10A:
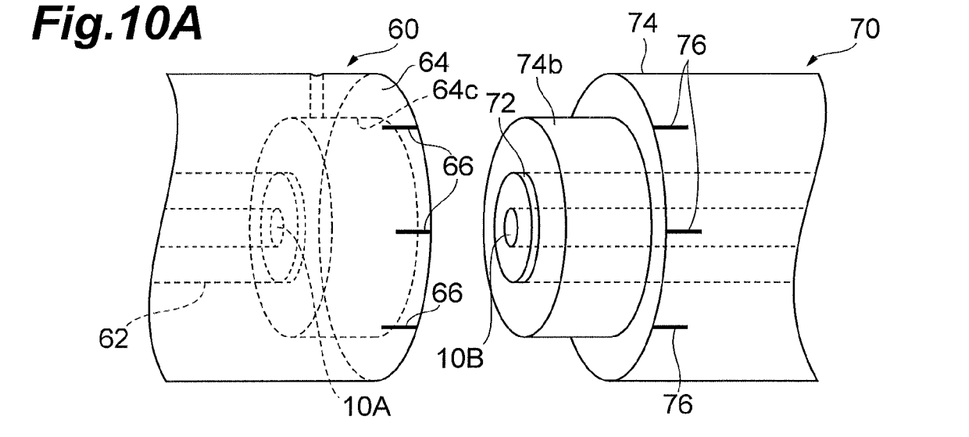
FIGS. 10A to 10C are a set of diagrams for explaining a method of adjusting core positions.
Figure 10B:
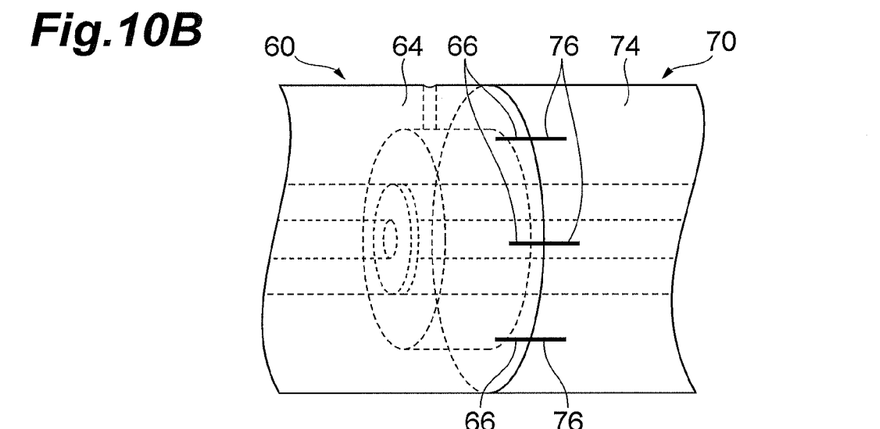
Figure 10C:
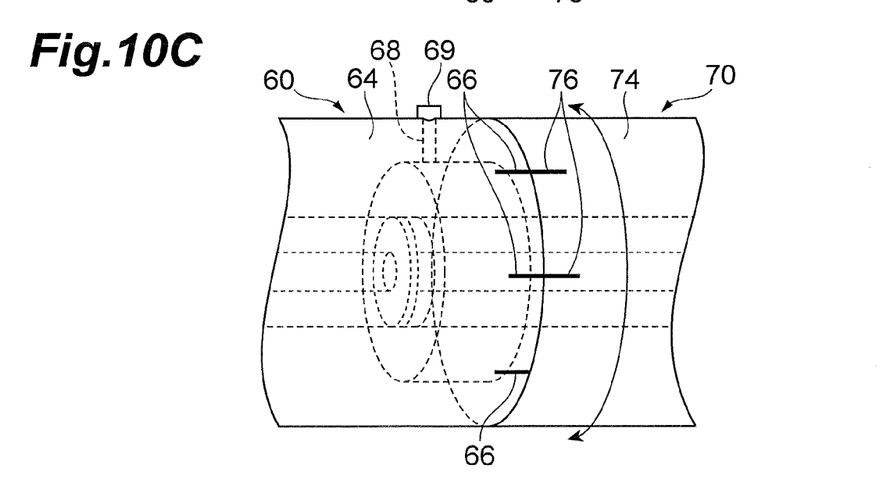

Such end surfaces 10A, 10B of the connectors 60, 70 and the like are coated with an index matching agent, after which the male connector 70 is inserted into the female connector 60, and the female portion 64c and the male portion 74b are mated such that the ferrules 62, 72 are substantially in contact with one another, as shown in FIG. 10A. Thereafter, as shown in FIGS. 10B and 10C, at least one of the connectors 60, 70 are rotated, while verifying relative positions of the memories 66, 76, to adjust each position of memories 66, 76, thereby making the desired cores correspond to one another. Subsequently, a screw 69 is inserted into the screw hole 68 for use in fastening, and the rotating holders 64, 74 are fastened together. In cases where there is little gap between the female portion 64c of the holder 64 and the male portion 74b of the holder 74, and fastening can be performed using the friction of both, the screw and the screw hole may be omitted. Furthermore, the end faces of both connectors 60, 70 may be flat faces rather than male/female.

This can change the distance by which the light propagates through the multicore optical fiber 10. Assuming the amount of relative rotation between the end faces 10A and 10B at their junction to be "n" core/cores, the example mentioned above corresponds to the case where n=1. When n=2, the distance by which the light propagates through the multicore optical fiber 10 is 2 $L+L_1+L_2$. When n=3, the distance by which the light propagates through the multicore optical fiber 10 is $L+L_1+L_2$.

Figure 4A:
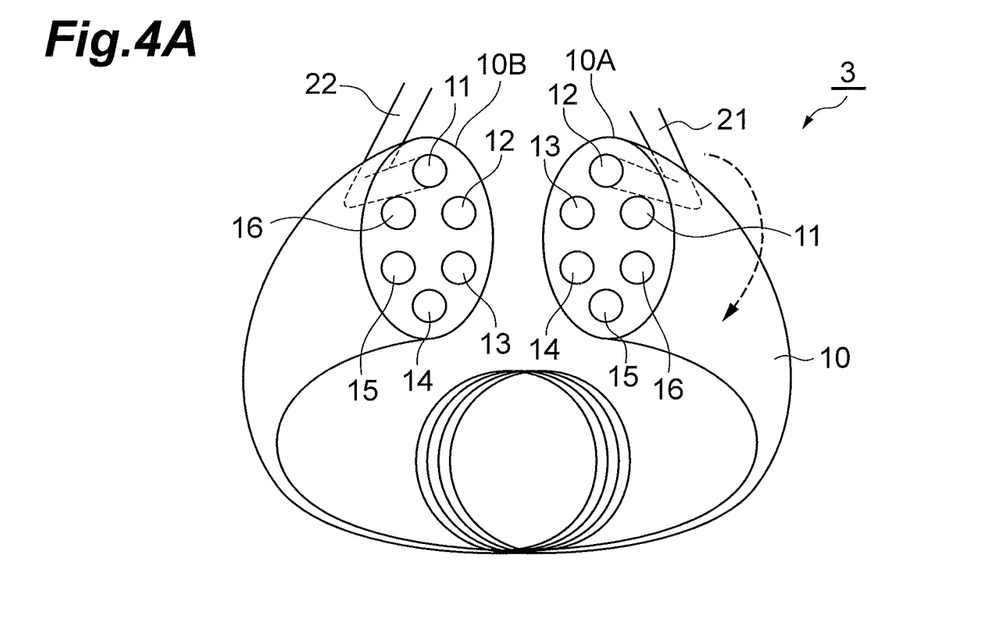
FIGS. 4A and 4B are a set of diagrams for explaining the structure of an optical component 3 in accordance with a third embodiment.
Figure 4B:
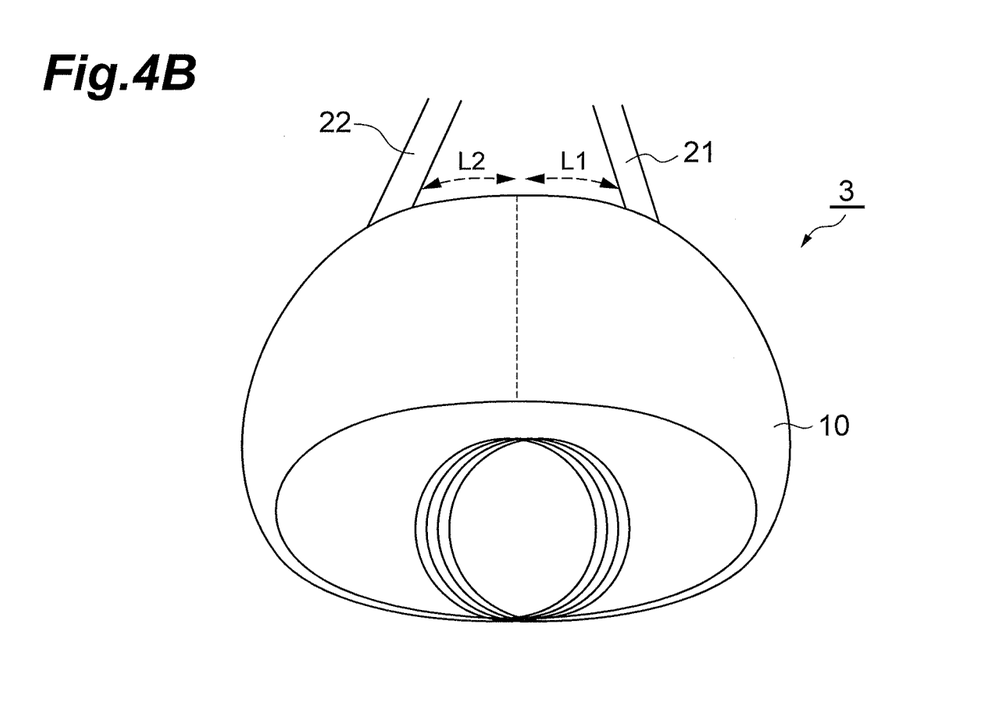

FIGS. 4A and 4B are a set of diagrams for illustrating the structure of an optical component 3 in accordance with the third embodiment. The optical component 3 in accordance with the third embodiment illustrated in FIGS. 4A and 4B structurally differs from the optical component 2 in accordance with the second embodiment illustrated in FIGS. 3A and 3B in the directions of optical coupling between the I/O optical fibers 21, 22 and the multicore optical fiber 10 and in that the I/O optical fiber 21 is optically coupled to the core 12 of the multicore optical fiber 10 by a fiber coupler.

In this embodiment, light introduced from the I/O optical fiber 21 to the core 12 of the multicore optical fiber 10 through the fiber coupler is guided by the distance $(L-L_1)$ through the core 12 and then fed to the core 13 at the interface, so as to be guided by the distance L through the core 13. Similarly, the light is guided by the distance L through each of the cores 14 to 16. Thereafter, the light introduced from the core 16 to the core 11 at the interface is guided by the distance $(L-L_2)$ through the core 11 and then issued to the I/O optical fiber 22 through the fiber coupler. Hence, when n=1, the distance by which the light propagates through the multicore optical fiber 10 is 6 $L-L_1-L_2$. When n=2, the distance by which the light propagates through the multicore optical fiber 10 is 3 $L-L_1-L_2$. When n=3, the distance by which the light propagates through the multicore optical fiber 10 is 2 $L-L_1-L_2$.

Figure 5:
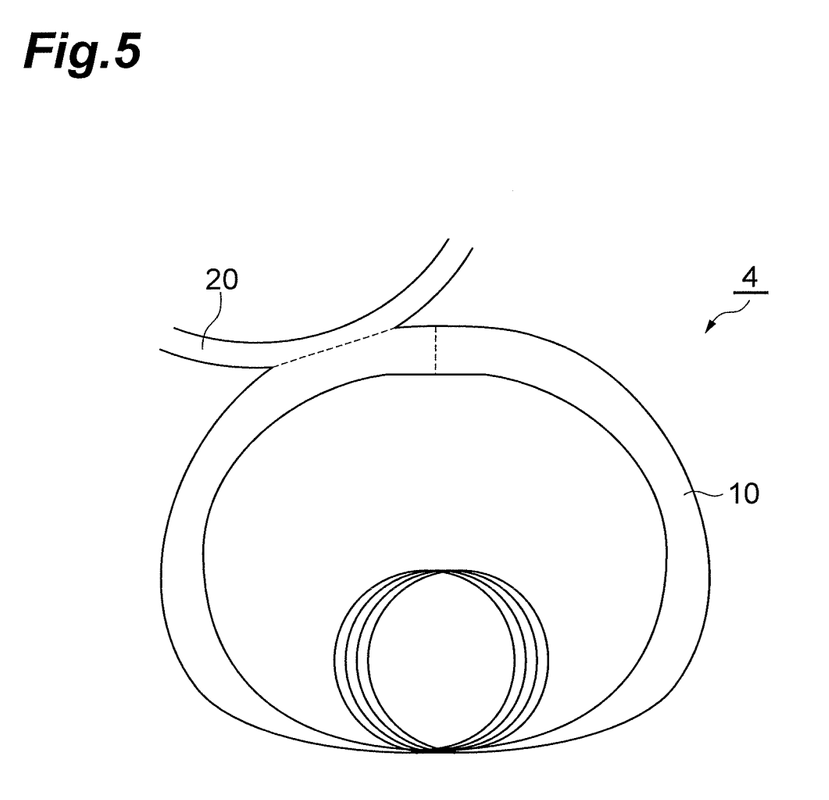
FIG. 5 is a diagram for explaining the structure of an optical component 4 in accordance with a fourth embodiment.

FIG. 5 is a diagram for illustrating the structure of an optical component 4 in accordance with the fourth embodiment. The optical component 4 comprises a multicore optical fiber 10 and an I/O optical fiber 20, while cores are optically coupled to each other through a fiber coupler, so that both ends of the I/O optical fiber 20 are used as I/O ports. In this case, when n=1, the distance by which the light propagates through the multicore optical fiber 10 is 6 L. When n=2, the distance by which the light propagates through the multicore optical fiber 10 is 3 L. When n=3, the distance by which the light propagates through the multicore optical fiber 10 is 2 L.

Thus, by making the end faces 10A, 10B of the multicore optical fiber 10 rotatable relative to each other about the fiber axis, the optical components 1 to 4 can vary the distance by which light propagates through the multicore optical fiber 10 and are not required to be replaced when changing characteristics. The optical components 1 to 4 can also be made smaller.

In general, letting "m" be the number of cores arranged at a fixed pitch on the circumference of a circle centered at the fiber axis in an end face of the multicore optical fiber 10, while assuming the amount of relative rotation between the end faces 10A and 10B at the junction to be "n" core/cores, the total distance $L_{total}$ by which the light propagates through the multicore optical fiber 10 is as follows. When "m" is a prime number or when "m" is not a prime number while "n" is not a divisor of "m", $L_{total}=(m-1)L+L_1+L_2$ in the structure of FIGS. 3A and 3B, and $L_{total}=ML-L_1-L_2$ in the structure of FIGS. 4A and 4B. When "m" is not a prime number while "n" is a divisor of "m", $L_{total}=(m/n-1)L+L_1+L_2$ in the structure of FIGS. 3A and 3B, and $L_{total}=(m/n)L-L_1-L_2$ in the structure of FIGS. 4A and 4B. The structure of FIG. 5 corresponds to a case where $L_1+L_2=L$ in the structure of FIGS. 3A and 3B.

Figure 6:
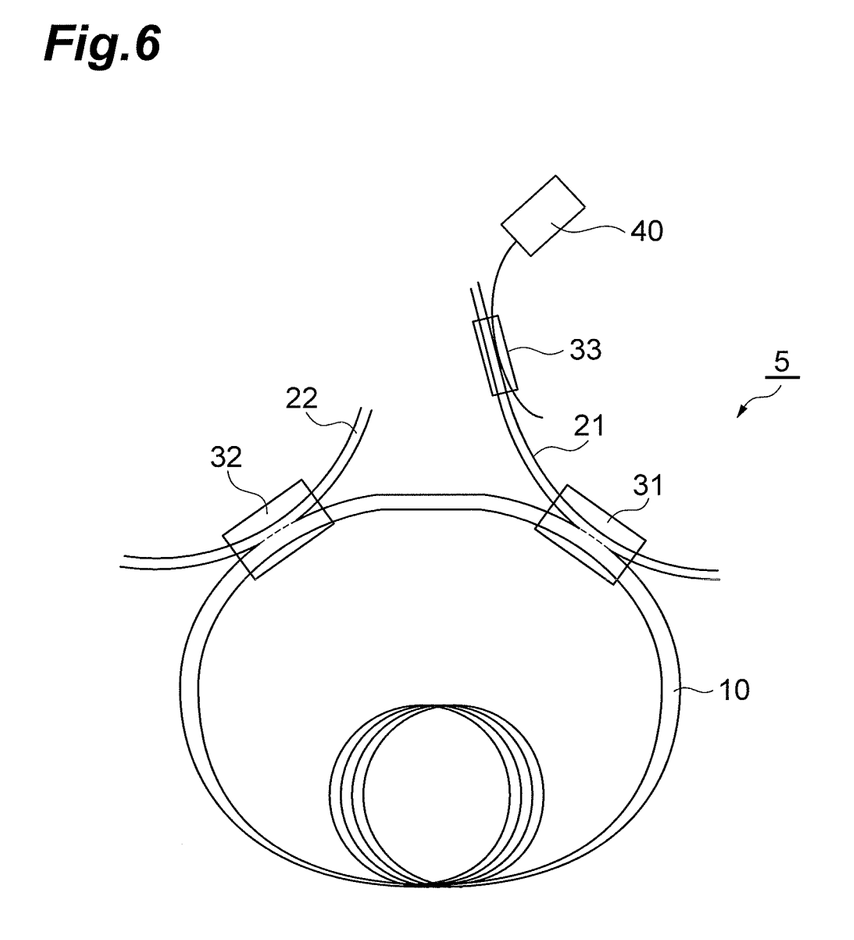
FIG. 6 is a diagram illustrating the structure of an optical fiber amplifier 5 in accordance with the first embodiment.

FIG. 6 is a diagram illustrating the structure of an optical fiber amplifier 5 in accordance with the first embodiment. The optical fiber amplifier 5 comprises a multicore optical fiber 10, I/O optical fibers 21, 22, couplers 31 to 33, and an excitation light source 40. Among these constituents, the multicore optical fiber 10, I/O optical fibers 21, 22, and couplers 31, 32 have the same structures as those in the optical component 2 illustrated in FIGS. 4A and 4B.

Each of the cores 11 to 16 in the multicore optical fiber 10 is doped with a rare-earth ion. Preferably, the rare-earth ion added to each core is an Er ion. The excitation light source 40 emits excitation light for exciting the rare-earth ion added to each core of the multicore optical fiber 10.

For example, six cores each having a core diameter of 10 μm are arranged at equally-spaced intervals on the circumference of a circle having a radius of 50 μm from the fiber axis serving as its center. That is, the six cores are arranged at respective apexes of a regular hexagon. Here, m=6, and n=1. The length L of the multicore optical fiber 10 is 3 m. The cores 12, 11 of the multicore optical fiber 10 are provided with the couplers 31, 32 located at about 0.5 m on the respective sides from the junction. That is, $L_1=L_2=0.5$ m.

The excitation light emitted from the excitation light source 40 and signal light to be amplified are multiplexed by the coupler 33 and then introduced to the core 12 of the multicore optical fiber 10 through the I/O optical fiber 21 and coupler 31. The signal light and excitation light propagate through the multicore optical fiber 10 by the distance of 6 $L-L_1-L_2$ through the multicore optical fiber 10, during which the signal light is amplified. The amplified signal light is fed from the core 11 to the I/O optical fiber 22 through the coupler 32.

When the rare-earth ion added to each of the cores in the multicore optical fiber 10 is an Er ion, the excitation light and signal light have wavelengths near 980 nm and near 1550 nm, respectively, for example. Each of the couplers 31, 32 is designed such that the efficiency of optical coupling therein from one core to the other core is 90% or higher at the signal light wavelength (near 1550 nm) and excitation light wavelength (near 980 nm). The coupler 33 is designed such that the optical coupling efficiency is 90% or higher at the excitation light wavelength and 10% or lower at the signal light wavelength. The coupling efficiency and wavelength characteristic of each coupler can be designed by using typical coupled-mode equations.

This structure yields a gain of about 20 dB. For attaining the same gain of 20 dB when using a typical single-core Er-doped optical fiber, an Er-doped optical fiber having a length of 17 m is necessary. This embodiment achieves a smaller size, since the length L of the multicore optical fiber 10 is 3 m.

From the core 11 of the multicore optical fiber 10 to the I/O optical fiber 22, the coupler 32 feeds the excitation light together with the amplified signal light. This makes it preferable to provide a wavelength filter for selectively blocking the excitation light fed to the I/O optical fiber 22.

The coupler 32 may be designed such that the optical coupling efficiency is 90% or higher at the signal light wavelength and 10% or lower at the excitation light wavelength. In this case, of the excitation light having reached the coupler 32 after propagating through the core 11 of the multicore optical fiber 10, about 90% propagates through the core 11 as it is, enters the core 12 at the junction therewith, and then exits to the I/O optical fiber 21 through the coupler 31. The excitation light exiting to the I/O optical fiber 22 together with the amplified signal light becomes scarcer, whereby the above-mentioned wavelength filter is unnecessary.

If the junction of the multicore optical fiber 10 has a rotary connector structure, the total length of the Er-doped cores through which the signal light and excitation light propagate can be altered so as to change the gain when it is necessary to change the gain due to modifications of transmission systems and the like. For introduction into such a system, the number of cores on the circumference of the same circle of the multicore optical fiber 10 is preferably set to a number (e.g., 12) having many divisors.

Figure 7:
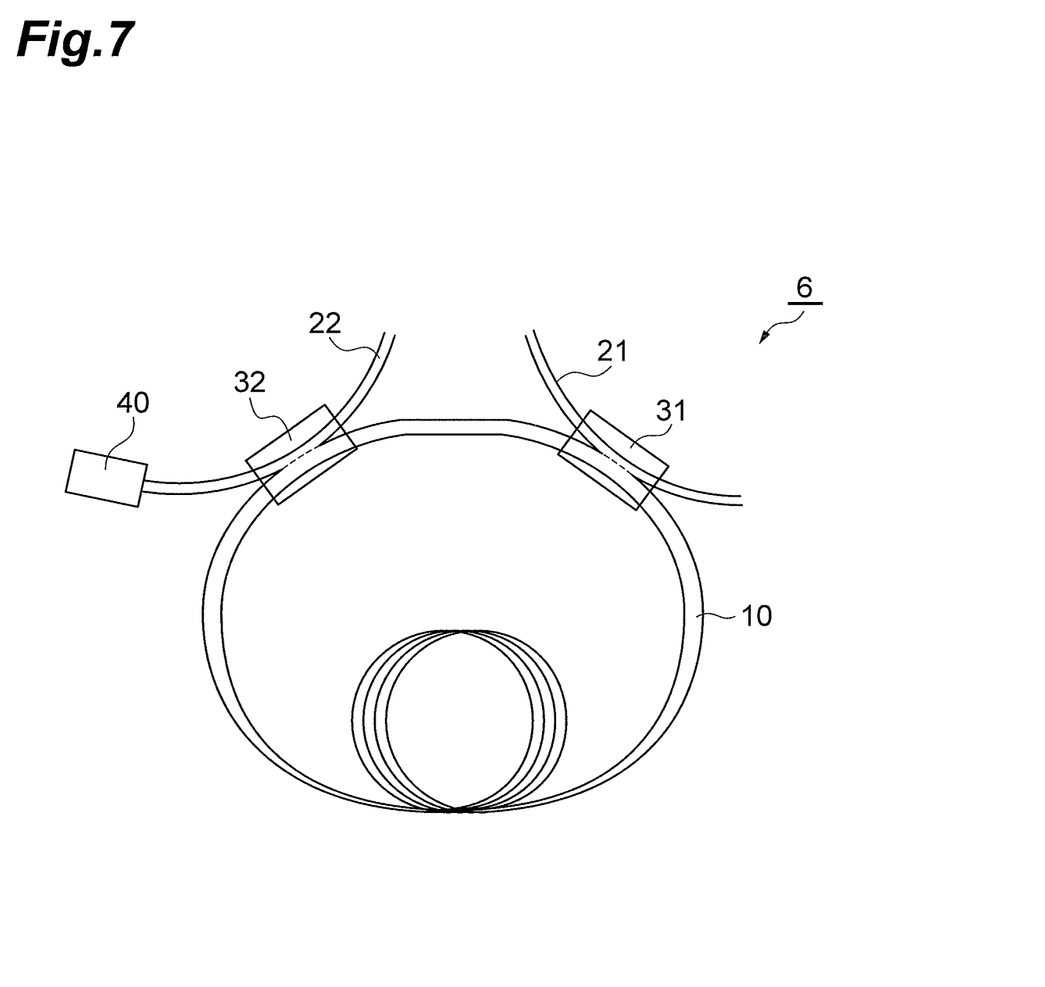
FIG. 7 is a diagram illustrating the structure of an optical fiber amplifier 6 in accordance with the second embodiment.

FIG. 7 is a diagram illustrating the structure of an optical fiber amplifier 6 in accordance with the second embodiment. The optical fiber amplifier 6 comprises a multicore optical fiber 10, I/O optical fibers 21, 22, couplers 31, 32, and an excitation light source 40. Among these constituents, the multicore optical fiber 10, I/O optical fibers 21, 22, and couplers 31, 32 have the same structures as those in the optical component 2 illustrated in FIGS. 4A and 4B.

In this embodiment, the excitation light emitted from the excitation light source 40 is introduced to the core 11 of the multicore optical fiber 10 through the I/O optical fiber 22 and coupler 32. Therefore, the coupler 33 for multiplexing the signal light and excitation light is unnecessary in this embodiment. The coupler 31 is designed such that the optical coupling efficiency is 90% or higher at the signal light wavelength and 10% or lower at the excitation light wavelength. The coupler 32 is designed such that the optical coupling efficiency is 90% or higher at each of the signal light wavelength and the excitation light wavelength.

The signal light to be amplified is introduced to the core 12 of the multicore optical fiber 10 through the I/O optical fiber 21 and the coupler 31. The signal light propagates through the cores 12, 13, 14, 15, and 16 in sequence and then exits to the I/O optical fiber 22 through the coupler 32 before reaching the junction with the core 11. On the other hand, the excitation light emitted from the excitation light source 40 is introduced to the core 11 of the multicore optical fiber 10 through the I/O optical fiber 22 and the coupler 32, so as to be fed to the core 12 at the junction therewith. Without substantially coupling with the I/O optical fiber 21 at the coupler 31, the excitation light propagates through the core 12 as it is and then through the cores 13, 14, 15, 16, and 11 in sequence, so as to exit to the I/O optical fiber 22 through the coupler 32 before reaching the junction with the core 11. In this case, from the core 11 of the multicore optical fiber 10 to the I/O optical fiber 22, the coupler 32 feeds the excitation light together with the amplified signal light. This makes it preferable to provide a wavelength filter which selectively blocks the excitation light fed to the I/O optical fiber 22.

Figure 8:
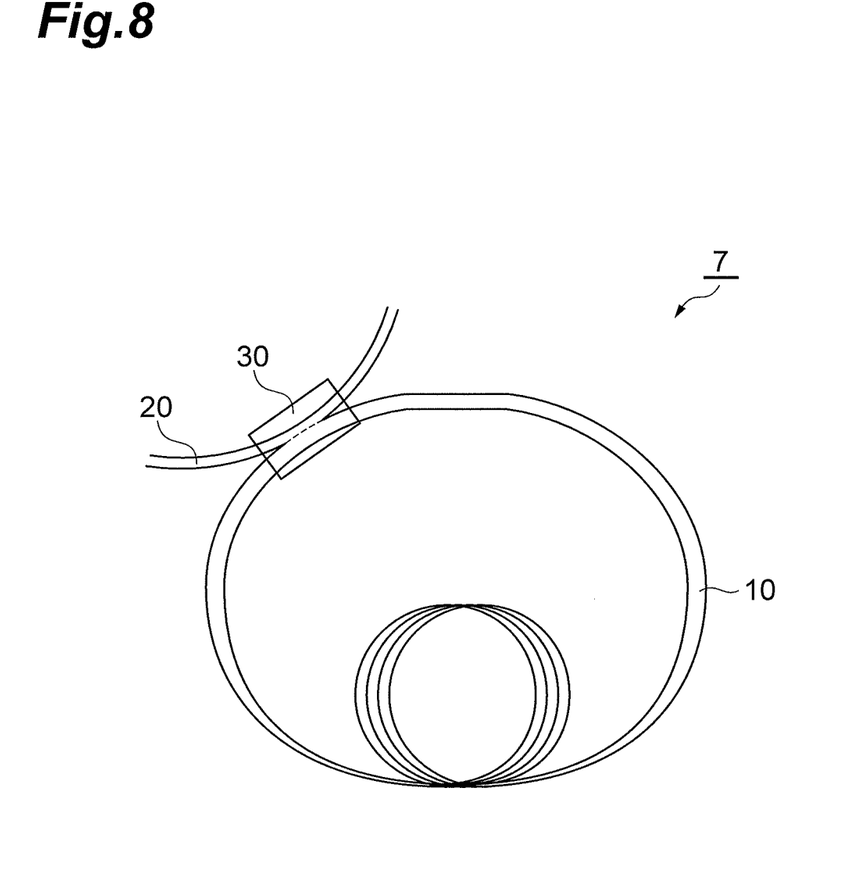
FIG. 8 is a diagram illustrating the structure of an optical fiber ring resonator 7 in accordance with an embodiment.

FIG. 8 is a diagram illustrating the structure of an optical fiber ring resonator 7 in accordance with an embodiment. The optical fiber ring resonator 7 comprises a multicore optical fiber 10, an I/O optical fiber 20, and a fiber coupler 30. The optical fiber ring resonator 7 includes the optical component 4 illustrated in FIG. 5. The coupling efficiency of the coupler 30 is preferably lower, e.g., 10%. Thus constructed optical fiber ring resonator 7 can be used for a sensor, for example. When each of cores of the multicore optical fiber 10 is doped with a rare-earth ion such as an Er ion, the optical fiber ring resonator 7 can also be used for a fiber laser. Since the optical fiber ring resonator 7 can change its characteristic according to the resonator length, a ring resonator adapted to change its characteristic according to its use can be constructed if the junction of the multicore optical fiber 10 has a rotary connector structure.

Without being restricted to the above-mentioned embodiments, the present invention can be modified in various ways. For example, in addition to a plurality of cores arranged at equally-spaced intervals on the circumference of a circle in an end face of the multicore optical fiber, a core may be placed at the center of the circle.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical component comprising:
   a multicore optical fiber having a plurality of longitudinally extending cores within a common cladding;
   an I/O optical fiber configured to feed light to/from a specific core in the plurality of cores of the multicore optical fiber; and
   a fiber coupler configured to optically couple the specific core of the multicore optical fiber and a core of the I/O optical fiber to each other,
   wherein the plurality of cores are arranged on a circumference of a circle centered at a fiber axis in an end face of the multicore optical fiber;
   wherein first and second end faces of the multicore optical fiber are connected to each other such that first and second cores in the plurality of cores of the multicore optical fiber are optically connected to each other; and
   wherein a distance between the cores in the fiber coupler is shorter than the sum of the shortest distance from an outer periphery of the specific core of the multicore optical fiber to an outer periphery of the cladding thereof and the shortest distance from an outer periphery of the core of the I/O optical fiber to an outer periphery of a cladding thereof.

2. The optical component according to claim 1, wherein at least three cores are arranged at a fixed pitch on the circumference of the circle centered at the fiber axis in the end face of the multicore optical fiber.

3. An optical component comprising:
   a multicore optical fiber having a plurality of longitudinally extending cores within a common cladding;
   an I/O optical fiber configured to feed light to/from a specific core in the plurality of cores of the multicore optical fiber; and
   a fiber coupler configured to optically couple the specific core of the multicore optical fiber and a core of the I/O optical fiber to each other,
   wherein the plurality of cores are arranged on a circumference of a circle centered at a fiber axis in an end face of the multicore optical fiber,
   wherein first and second end faces of the multicore optical fiber are connected to each other such that first and second cores in the plurality of cores of the multicore optical fiber are optically connected to each other, and
   further comprising a rotation unit configured to rotate the first and second end faces of the multicore optical fiber relative to each other about the fiber axis.

4. The optical component according to claim 1, wherein each of the plurality of cores of the multicore optical fiber is doped with a rare-earth ion.

5. The optical component according to claim 4, wherein the rare-earth ion is an Er ion.

6. The optical component according to claim 4, wherein the fiber coupler comprises a first coupler and a second coupler.

7. An optical fiber amplifier comprising:
   the optical component according to claim 4; and
   an excitation light source configured to output excitation light that excites a rare-earth ion added to each of the plurality of cores of the multicore optical fiber of the optical component,
   wherein the fiber coupler of the optical component introduces the excitation light and the signal light to the core of the multicore optical fiber and takes out the signal light amplified in the core of the multicore optical fiber.

8. The optical fiber amplifier according to claim 7, wherein the fiber coupler has a coupling efficiency of 90% or higher at each of wavelengths of the signal light and the excitation light.

9. The optical fiber amplifier according to claim 7, wherein the fiber coupler comprises a first coupler and a second coupler;
   wherein the first coupler has a coupling efficiency of 90% or higher at each of wavelengths of the signal light and the excitation light; and
   wherein the second coupler has a coupling efficiency of 90% or higher at the wavelength of the signal light and 10% or lower at the wavelength of the excitation light.

10. An optical fiber ring resonator comprising:
    a multicore optical fiber having a plurality of longitudinally extending cores within a common cladding;
    an I/O optical fiber configured to feed light to/from a specific core in the plurality of cores of the multicore optical fiber; and
    a fiber coupler configured to optically couple the specific core of the multicore optical fiber and a core of the I/O optical fiber to each other,
    wherein the plurality of cores is arranged on a circumference of a circle centered at a fiber axis in an end face of the multicore optical fiber;
    wherein first and second end faces of the multicore optical fiber are connected to each other such that first and second cores in the plurality of cores of the multicore optical fiber are optically connected to each other; and
    wherein a distance between the cores in the fiber coupler is shorter than the sum of the shortest distance from an outer periphery of the specific core of the multicore optical fiber to an outer periphery of the cladding thereof and the shortest distance from an outer periphery of the core of the I/O optical fiber to an outer periphery of a cladding thereof; and
    wherein the fiber coupler has a coupling efficiency of 10% or lower.

* * * * *